(No Model.)
C. H. McLELLAN.
TRIPOD FOR LIFE SAVING APPARATUS.
No. 335,083. Patented Jan. 26, 1886.
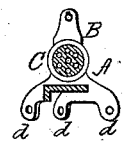
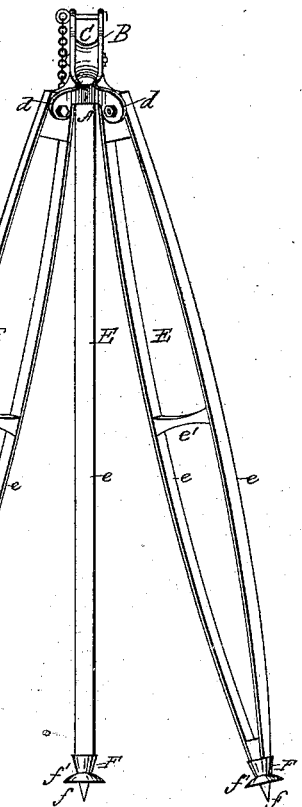
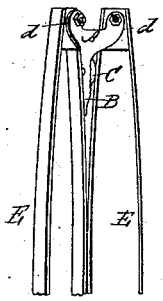
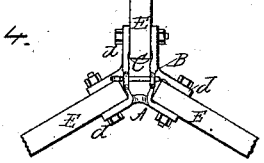
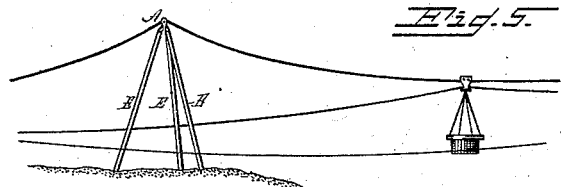
Witnesses:
Will W. Powell
A. A. Connolly
Inventor:
Chas. H. McLellan
By Connolly Bros.,
Attorneys.

UNITED STATES PATENT OFFICE.

CHARLES HUGH McLELLAN, OF TOM'S RIVER, NEW JERSEY, ASSIGNOR TO GOODELL & WATERS, OF PHILADELPHIA, PENNSYLVANIA.

TRIPOD FOR LIFE-SAVING APPARATUS.

SPECIFICATION forming part of Letters Patent No. 335,083, dated January 26, 1886.

Application filed May 25, 1885. Serial No. 166,679. (No model.)

*To all whom it may concern:*

Be it known that I, CHARLES H. McLELLAN, a citizen of the United States, residing at Tom's River, in the county of Ocean and State of New Jersey, have invented certain new and useful Improvements in Tripods for Life-Saving Apparatus, &c.; and I do hereby declare the following to be a full, clear, and exact description of the invention, reference being had to the accompanying drawings, which form part of this specification, in which—

Figure 1 is an elevation of tripod. Fig. 4 is a plan showing legs extended. Fig. 2 is a vertical section of bracket. Fig. 3 is an elevation showing tripod folded with bracket-standard between legs. Fig. 5 is a perspective of tripod with hawser in position when operating.

My invention has for its object to provide a light, efficient, and time and labor saving tripod as a substitute for the crotch heretofore used for the support of the hawser in life-saving apparatus.

When raising the crotch now in use, its head has to be inclined toward the wreck to allow it to come to a perpendicular position when the hawser is taut, and it requires constant attention of the crew until the hawser is taut. Every time the hawser becomes slack through the passage of one or more over it in the buoy the crotch requires the attention of two or more attendants to prevent its falling while getting the necessary strain on the hawser, and if there be much motion to the vessel it must also be tended to prevent its falling through the sudden jerking of the hawser; also, when the tackle on the hawser has to be veered and hauled to accommodate the motion of the vessel the crotch requires the attention of two or more men to prevent its falling.

My invention consists of a tripod comprising a bracket-head which affords bearings for the shaft of a sheave, and also as a medium for pivotally connecting the legs of the tripod, so that the latter can be spread to lie flat upon the ground, can be elevated to a standing position at any angle, and can be folded so as to become parallel with the head between them. The legs of the tripod are each made in the form of a truss, consisting of two arches or bows united at the ends and separated at the middle by a post or stud, and provided at its lower end with a shoe having a point to prevent slipping on hard or frozen ground, and a saucer-shaped or concave disk to prevent sinking into the sand or soft ground.

Referring to the accompanying drawings, A designates the bracket, which has an upright or double standard, B, that affords bearings for the shaft of a sheave, C, therein. Said bracket has also three sets or pairs of lugs, $d$ $d$, in which are pivoted the upper ends of the legs E E E. Each leg is in the form of a truss, composed of two bows, $e$ $e$, secured at their ends and separated at their middle by a post or stud, $e'$. On the lower end of each of said legs is a shoe, F, having a point, $f$, and a concave disk, $f'$, whose concave side is downward.

When closed, the legs are folded up, bringing the standards and sheave between the legs, as shown in Fig. 3. When opening for use, one man carries it to the point required, drops the head upon the ground, and allows the legs to fall out and down, which leaves the sheave uppermost, ready for the hawser. The hawser is hauled moderately taut, placed between the standards upon the sheave, and the sheave-pin inserted, when, with one man at each leg, the tripod is raised into position, with two legs to the front and one in the rear. It requires no further care or attention, but can be left to haul taut or slack the hawser, as circumstances require.

With the use of the tripod those men who are necessary to watch the crotch can be used elsewhere, as the tripod stands firmly braced and the hawser plays freely over the sheave either when hauling it taut or veering and hauling when the motion of the vessel requires such attention.

With the tripod the hawser is not nipped, as it is in the jaws of the crotch.

What I claim as my invention is—

The combination, with a tripod consisting of a head, A, with a standard for supporting a sheave and legs pivotally secured to said head in lugs thereon, of a sheave, C, substantially as shown and described.

In testimony that I claim the foregoing I have hereunto set my hand this 29th day of April, 1885.

CHARLES HUGH McLELLAN.

Witnesses:
ANDREW HERO, Jr.,
HENRY GOVAN.